United States Patent
Reppuhn et al.

(10) Patent No.: US 7,913,583 B2
(45) Date of Patent: Mar. 29, 2011

(54) TRANSMISSION SHIFT CONTROL MECHANISM AND METHOD OF INSTALLATION

(75) Inventors: Tamara J. Reppuhn, Hemlock, MI (US); Jason N. Wright, Lansing, MI (US); Bernard J. Emmendorfer, Saginaw, MI (US); Frank R. Keipert, Bay City, MI (US); Richard P. Nash, Frankenmuth, MI (US); Michael C. Vermeersch, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 840 days.

(21) Appl. No.: 11/820,220

(22) Filed: Jun. 18, 2007

(65) Prior Publication Data

US 2008/0000314 A1    Jan. 3, 2008

Related U.S. Application Data

(60) Provisional application No. 60/816,941, filed on Jun. 28, 2006.

(51) Int. Cl.
*B60K 20/00* (2006.01)
*B60K 5/00* (2006.01)
*G05G 5/08* (2006.01)

(52) U.S. Cl. ............... 74/473.24; 74/473.21; 74/473.23

(58) Field of Classification Search ............... 74/473.1, 74/473.21, 473.23, 473.24
See application file for complete search history.

(56) References Cited

U.S. PATENT DOCUMENTS

| | | | |
|---|---|---|---|
| 3,583,184 A | 6/1971 | Papale | |
| 4,365,522 A | 12/1982 | Kubota et al. | |
| 4,909,096 A | 3/1990 | Kobayashi | |
| 4,919,242 A | 4/1990 | Muramatsu et al. | |
| 4,934,496 A | 6/1990 | Barske et al. | |
| 4,936,158 A | 6/1990 | Livshits et al. | |
| 4,938,042 A | 7/1990 | Muramatsu | |
| 4,986,143 A | 1/1991 | Livshits et al. | |
| 5,029,680 A | 7/1991 | Kobayashi et al. | |
| 5,036,962 A | 8/1991 | Amagasa | |
| 5,220,984 A | 6/1993 | Ruiter | |
| 5,247,849 A * | 9/1993 | Sato | 74/473.3 |
| 5,251,723 A | 10/1993 | Rolinski et al. | |
| 5,277,077 A | 1/1994 | Osborn | |
| 5,289,907 A | 3/1994 | Pattock | |
| 5,309,783 A * | 5/1994 | Doolittle et al. | 74/473.21 |
| 5,402,870 A | 4/1995 | Osborn | |
| 5,458,017 A | 10/1995 | Kanematsu et al. | |
| 5,489,246 A | 2/1996 | Moody et al. | |
| 5,493,932 A * | 2/1996 | Plocher | 74/483 R |
| 5,494,141 A | 2/1996 | Osborn et al. | |
| 5,546,775 A | 8/1996 | Lee | |

(Continued)

*Primary Examiner* — Thomas R Hannon
*Assistant Examiner* — Justin Krause
(74) *Attorney, Agent, or Firm* — Cantor Colburn LLP

(57) ABSTRACT

A transmission gear selector including a pivotal shift lever with a grip portion and an attachment structure that is operably coupled to an automatic transmission for shifting the transmission. A locking member pivots with the shift lever and is moveably engageable with an engagement surface that defines a park position detent. When the locking member is engaged with the park position detent, the shift lever cannot be moved out of the park position. The mechanical linkage includes a driver-operated member which, when actuated, causes the mechanical linkage assembly to bias the locking member out of engagement with the park position detent. A solenoid disposed within the grip portion is coupled with the mechanical linkage assembly and includes a plunger that can prevent the mechanical linkage from biasing the locking member out of the park position detent. An installation method for a gear selector is also disclosed.

20 Claims, 3 Drawing Sheets

U.S. PATENT DOCUMENTS

| | | |
|---|---|---|
| 5,598,740 A | 2/1997 | Itoh |
| RE35,772 E | 4/1998 | Ratke et al. |
| 5,765,413 A * | 6/1998 | Jung .............................. 70/201 |
| 5,938,562 A | 8/1999 | Withey |
| 6,339,968 B1 | 1/2002 | Nagashima |
| 6,374,978 B1 | 4/2002 | Spencer |
| 6,945,377 B2 | 9/2005 | Burr et al. |
| 2006/0032723 A1 | 2/2006 | Wilber |
| 2006/0053931 A1 | 3/2006 | Bye |

* cited by examiner

TRANSMISSION SHIFT CONTROL MECHANISM AND METHOD OF INSTALLATION

CROSS REFERENCE TO RELATED APPLICATIONS

This application claims priority under 35 U.S.C. 119(e) of U.S. provisional patent application Ser. No. 60/816,941 filed on Jun. 28, 2006 entitled TRANSMISSION SHIFT CONTROL MECHANISM the disclosure of which is hereby incorporated herein by reference.

BACKGROUND OF THE INVENTION

1. Field of the Invention

The present invention relates to transmission shift mechanisms and, more specifically, to transmission shift mechanisms for vehicles having an automatic transmission.

2. Description of the Related Art

Automobiles having automatic transmissions typically include a transmission shift mechanism that is operated by the driver of the vehicle for selecting the gear or operating mode of the automatic transmission. Such automatic transmissions often allow for selection between Park-Reverse-Neutral-Drive-Low (PRNDL) gear arrangements. It has become relatively common for automobiles with automatic transmissions to employ a lockout feature that prevents a driver from shifting the transmission out of Park unless the ignition key has been inserted and turned to the "ON" position to thereby inhibit the theft of the vehicle. It is also known to use a lockout feature to prevent the driver from shifting the transmission out of Park unless the driver has activated the brake light circuit by depressing the brake pedal as a safety precaution.

While a variety of different transmission shift lockout devices have been developed, there remains a need for further improvements in such devices. Moreover, many older automobiles having automatic transmissions are increasingly being restored by individuals and such vehicles will often not include a Park lockout feature. Thus, a device that allowed such older vehicles to be provided with a Park lockout feature would provide benefits to the owners of such vehicles.

SUMMARY OF THE INVENTION

The present invention provides a transmission gear selector for use with a vehicle having an automatic transmission that provides a Park lockout feature utilizing a solenoid located proximate the grip portion of the gear selector. The disclosed transmission gear selectors provide a compact design that can be beneficially employed in new vehicles and is particularly well adapted for installation in existing older vehicles that do not include a Park lockout feature to provide such vehicles with a Park lockout feature.

The invention comprises, in one form thereof, a transmission gear selector operable by a driver of a vehicle with an automatic transmission having a plurality of operating modes that includes a park mode. The gear selector includes a shift lever mountable on the vehicle. The shift lever is moveable through a pivotal range of motion and defines a pivot axis. The shift lever has a grip portion adapted for gripping by the driver and an attachment structure adapted for operably coupling the gear selector to the automatic transmission whereby pivoting movement of the shift lever through the pivotal range shifts the automatic transmission between the plurality of operating modes. Pivotally disposing the shift lever in a park position shifts the automatic transmission into the park mode. A locking member is operably coupled and pivotally moveable with the shift lever. The gear selector also includes a body defining an engagement surface wherein the locking member is moveably engageable with the engagement surface. The engagement surface defines a park position detent wherein, when the shift lever is in the park position, the locking member is engageable with the park position detent. Engagement of the locking member with the park position detent prevents pivotal movement of the shift lever out of the park position. The gear selector also includes a mechanical linkage assembly having a driver-operated member which is operably engaged with the locking member. The mechanical linkage is disposed in a park position configuration when the locking member is engaged with the park position detent. Actuation of the driver-operated member moves the mechanical linkage out of the park position configuration and movement of the mechanical linkage out of the park position configuration biases the locking member out of engagement with the park position detent and thereby allows pivotal movement of the shift lever out of the park position. A solenoid is disposed within the grip portion and has a plunger selectively moveable between a first plunger position and a second plunger position. The plunger is operably coupled with the mechanical linkage assembly wherein, when the mechanical linkage is in the park position configuration and the plunger is in the first plunger position, the plunger prevents movement of the mechanical linkage and thereby prevents biasing the locking member out of engagement with the park position detent and wherein, when the plunger is in the second plunger position, the plunger allows movement of the mechanical linkage and thereby allows biasing of the locking member out of engagement with the park position detent.

The invention comprises, in yet another form thereof, a transmission gear selector operable by a driver of a vehicle having an automatic transmission with a plurality of operating modes including a park mode. The gear selector includes a shift lever mountable on the vehicle. The shift lever is moveable through a pivotal range of motion and defines a pivot axis. The shift lever includes an elongate tubular portion and a grip portion adapted for gripping by the driver proximate one end of the elongate tubular portion. The shift lever also includes an attachment structure adapted for operably coupling the gear selector to the automatic transmission proximate an opposite end of the elongate tubular portion whereby pivoting movement of the shift lever through the pivotal range shifts the automatic transmission between the plurality of operating modes and wherein pivotally disposing the shift lever in a park position shifts the automatic transmission into the park mode. A locking member is operably coupled and pivotally moveable with the shift lever. The shift lever is pivotally mounted to a mounting bracket. The mounting bracket defines an engagement surface wherein the locking member is moveably engageable with the engagement surface. The engagement surface defines a park position detent wherein the locking member is engageable with the park position detent when the shift lever is in the park position. Engagement of the locking member with the park position detent prevents pivotal movement of the shift lever out of the park position. The gear selector also includes a mechanical linkage assembly. The mechanical linkage assembly includes a driver-operated member disposed on the grip portion that is operably coupled with an elongate member extending within the elongate tubular portion of the shift lever. The mechanical linkage is operably coupled with the locking member wherein the elongate member is disposed in a first axial position when the locking member is engaged with the park position detent and actuation of the driver-operated member moves the elongate member out of the first axial position thereby biasing the locking member out of engagement with the park position detent and allowing pivotal movement of the shift lever out of the park position. A solenoid is disposed within the grip portion and has a plunger selectively moveable between a first plunger position and a second plunger position. The plunger is operably coupled with the elongate member wherein, when the elongate member is in the first axial position and the plunger is in the first plunger position, the plunger prevents axial movement of the elongate member and thereby prevents the biasing of the locking member out of engagement with the park position detent and wherein, when the plunger is in the second plunger position, the plunger allows axial movement of the elongate member and thereby allows biasing of the locking member out of engagement with the park position detent.

The invention comprises, in yet another form thereof, a method of installing a transmission gear selector in a preexisting vehicle having an automatic transmission with a plurality of operating modes. The method includes providing a first gear selector having a shift lever moveable through a pivotal range of motion and defining a pivot axis, the shift lever having a grip portion adapted for gripping by a driver and an attachment structure. The gear selector also includes a locking member operably coupled and pivotally moveable with said shift lever and a mounting bracket defining an engagement surface. The locking member is moveably engageable with the engagement surface. The engagement surface defines a park position detent wherein the locking member is engageable with the park position detent when the shift lever is in a park position and engagement of the locking member with the park position detent prevents pivotal movement of the shift lever out of the park position. The first gear selector is also provided with a mechanical linkage assembly and a solenoid. The mechanical linkage assembly has a driver-operated member and is operably engaged with the locking member wherein the mechanical linkage is disposed in a park position configuration when the locking member is engaged with the park position detent. Actuation of the driver-operated member moves the mechanical linkage out of the park position configuration and movement of the mechanical linkage out of the park position configuration biases the locking member out of engagement with the park position detent and thereby allows pivotal movement of the shift lever out of the park position. The solenoid is disposed within the grip portion and has a plunger selectively moveable between a first plunger position and a second plunger position. The plunger is operably coupled with the mechanical linkage assembly wherein, when the mechanical linkage is in the park position configuration and the plunger is in the first plunger position, the plunger prevents movement of the mechanical linkage and thereby prevents biasing of the locking member out of engagement with the park position detent and wherein, when the plunger is in the second plunger position, the plunger allows movement of the mechanical linkage and thereby allows biasing of the locking member out of engagement with the park position detent. The method also includes removing an existing second gear selector from the vehicle, securing the mounting bracket of the first gear selector to the vehicle, operably coupling the attachment structure with the automatic transmission wherein pivoting movement of the shift lever through the pivotal range shifts the automatic transmission between the plurality of operating modes, and wherein pivotally disposing the shift lever in the park position shifts the automatic transmission into a park mode and operably coupling the solenoid with an electrical system of the vehicle.

In some embodiments of the invention, the first gear selector is fully functional within the vehicle upon securing the mounting bracket to the vehicle, operably coupling the attachment structure with the automatic transmission and operably coupling the solenoid with the electrical system.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
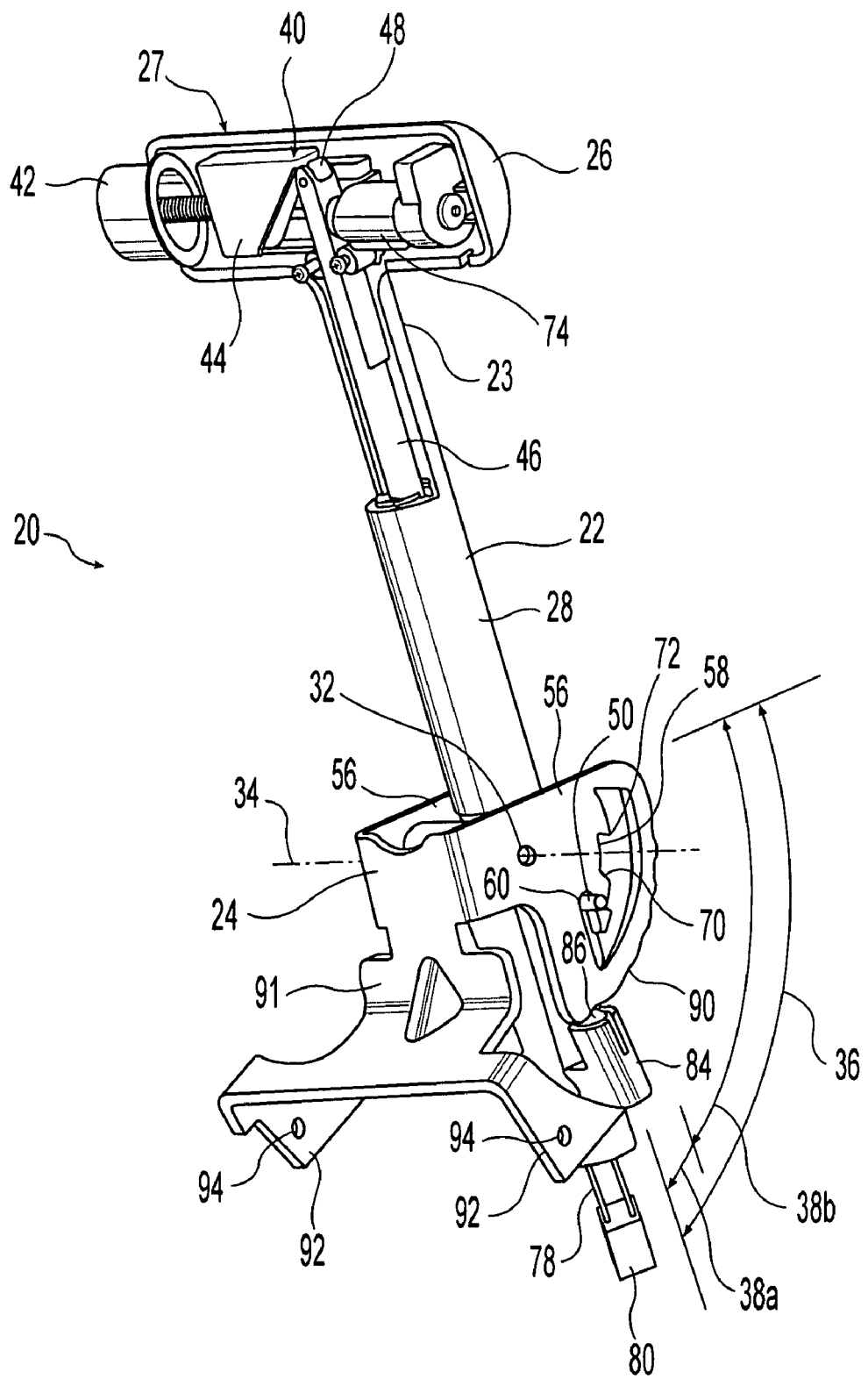
FIG. 1 is a partial cut-away perspective view of a gear selector in accordance with the present invention.
Figure 2:
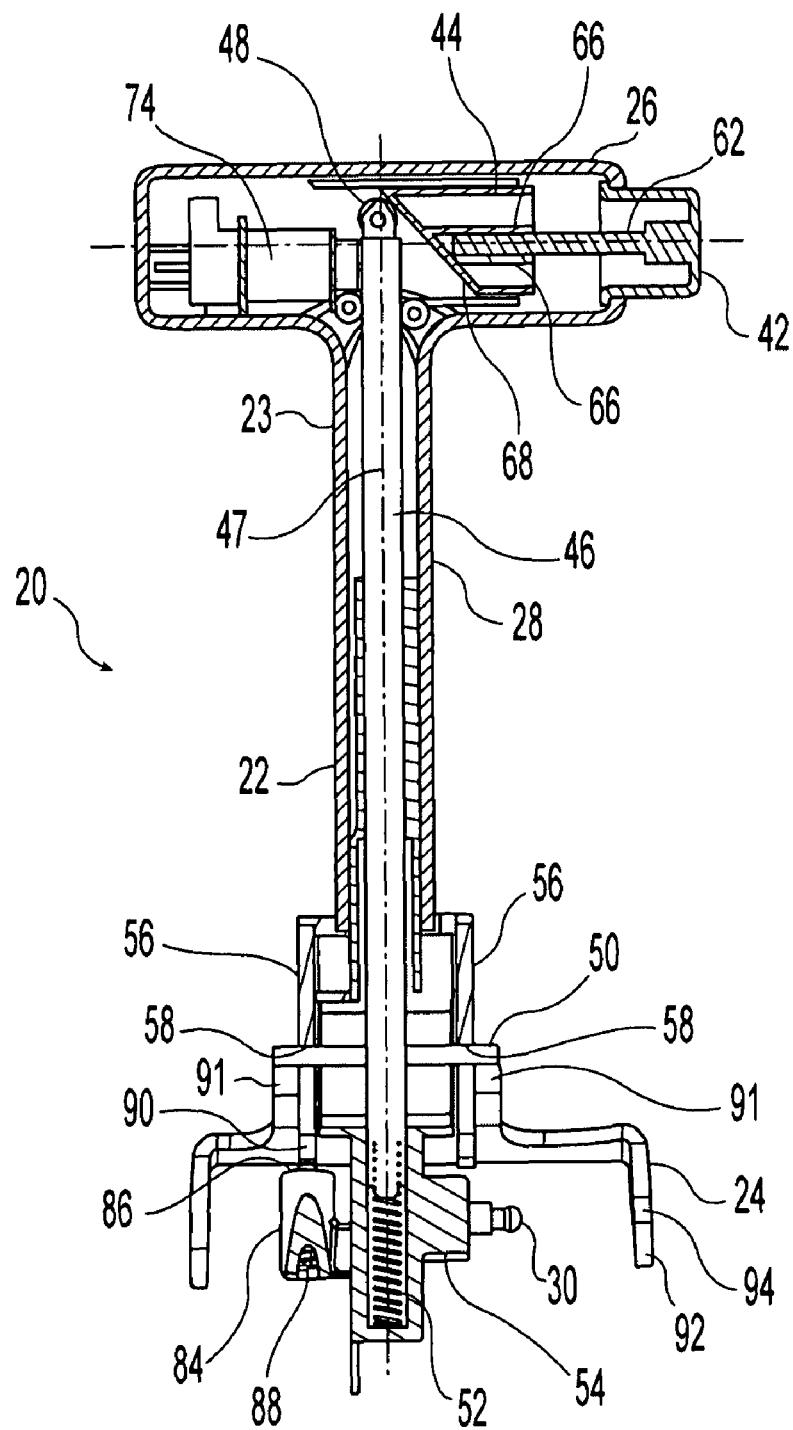
FIG. 2 is a cross sectional view of the gear selector of FIG. 1.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

A driver-operated transmission gear selector 20 is illustrated in FIGS. 1-4. Gear selector 20 is adapted for mounting in a vehicle having an automatic transmission (not shown). Gear selector 20 includes a shift lever 22 that is coupled with a body 24. Shift lever 22 includes a grip portion 26, an elongate tubular portion 28 and an attachment structure 30. Attachment structure 30 is operably coupled to the automatic transmission of the vehicle via a cable or other suitable means.

Shift lever 22 is pivotally mounted to body 24 with a pivot pin 32 which defines pivot axis 34. Shift lever 22 is moveable through a pivotal range of motion 36 about pivot axis 34. The pivoting movement of shift lever 22 about axis 34 shifts the automatic transmission between a plurality of operating modes, e.g., park, reverse, neutral, drive and low operating modes, via the cable attached to structure 30. The use of a cable to operably couple a shift lever to an automatic transmission is well known to those having ordinary skill in the art.

Gear selector 20 also includes a mechanical linkage assembly 40. Linkage assembly 40 includes a driver operated member 42, a wedge shaped member 44 and an elongate member 46. A roller 48 is mounted on the upper end of elongate member 46 and is in rolling contact with wedge-shaped member 44. A locking member 50 is mounted on elongate member 46 near its lower end. In the illustrated embodiment locking member 50 takes the form of a metal pin that is press-fit mounted in a bore hole extending through elongate member 46. A spring 52 biases elongate member 46 upwardly. Spring 52 is located in base member 54 which telescopingly receives elongate member 46 and pivots with elongate member 46 and shift lever 22. Attachment structure 30 extends from base member 54.

The mounting of locking member 50 on elongate rod 46 operably couples locking member 50 with shift lever 22. As shift lever 22 is pivoted through pivotal range 36, locking member 50 is also pivoted through range 36. In the illustrated embodiment, body 24 is formed out of sheet metal stock that is stamped and bent into its final configuration to form a mounting bracket. Other suitable forms of body 24 may be used in alternative embodiments of the invention.

As best seen in FIG. 1, body 24 includes a pair of sidewalls 56 located on opposite sides of shift lever 22. Each of the sidewalls 56 define an engagement surface 58. The upward bias of spring 52 exerted on elongate member 46 biases the opposite ends of locking member 50 towards engagement surfaces 58. In the illustrated embodiment, engagement surfaces 58 take the form of a pair of common stepped profiles. Stepped profiles 58 each include a parking detent 60. Shift lever 22 is shown in its "park position" in FIG. 1 which corresponds to placing the automatic transmission in its "park" mode. The pivotal position of shift lever 22 when in the park position is indicated by reference number 38a. Reference number 38b indicates the remaining pivotal range of motion of shift lever 22 wherein shift lever 22 is not in the "park" position, but, instead, is in a position which places the automatic transmission in one of its other operating modes, e.g., reverse, neutral, drive, low.

When shift lever 22 is pivoted to its park position 38b, locking member 50 will be aligned with parking detents 60. When elongate rod 46 is biased toward grip portion 26, locking member 50 will be seated within parking detents 60 and the interaction of locking member 50 and detents 60 will prevent the pivotal movement of shift lever 22 out of the park position. When button 42 is depressed by the driver of the vehicle, internal stem 62 of button 42 will bias wedge member 44 towards elongate member 46. A spring 64 biases wedge 44 and button 42 apart and a hollow cylinder 66 within wedge member 44 maintains the alignment of wedge 44 and button 42. A camming surface 68 on wedge 44 engages roller 48 and as wedge 44 is moved by the depression of user-operated member 42, elongate member 46 is biased downwardly toward body 24. A roller 48 is shown in the illustrated embodiment and provides for relatively smooth motion of elongate member 46 as wedge member 44 biases elongate member 46. The use of a roller at the interface between wedge member 44 and elongate member 46 is not necessary, however, and a simple sliding engagement between the two parts may also be used. It is also noted that while a particular design of mechanical linkage 40 is disclosed herein, alternative linkages which do not necessarily include camming surfaces or wedge members or the other specific aspects of linkage 40 that are disclosed herein may also be employed with the present invention.

As elongate member 46 is displaced along its axis 47 away from grip portion 26 (sometimes referred to herein as downwardly but not necessarily indicating a position relative to the local ground surface), locking member 50 is also axially displaced away from grip portion 26 and thereby unseated from parking detents 60 allowing shift lever 22 to be out of its park position 38a. Thus the interaction of locking member 50 and parking detents 60 prevent shift lever 22 from being moved out of its park position unless driver-operated member 42 of the linkage assembly 40 is depressed by the driver. It is also noted that the terms locking member and detent, as used herein, are used in their broadest sense and include any cooperating structures capable of holding one mechanical part in relation to another part and which can be released by the application of a force to one of the parts.

Outside of parking detent 60, stepped profiles 58 include steps 70 and 72. Due to the axial biasing action of spring 52, step 70 allows shift lever 22 to be moved from reverse into neutral without the driver depressing member 42 but requires the driver to depress member 42 to axially bias locking member 50 to allow shift lever 22 to move from its neutral position into its reverse position. Similarly, step 72 allows shift lever 22 to be moved from low to drive without the driver depressing member 42 but requires the driver to depress member 42 to move shift lever 22 from drive into low. Although a pair of stepped profiles are used in the illustrated embodiment, a single engagement surface 58, whether formed on a stamped metal bracket or other solid body, would be sufficient to provide the same functions as the illustrated pair of stepped profiles.

In the illustrated embodiment, grip portion 26 takes the form of a T-shaped handle 27 with driver operated member 42 and a solenoid 74 being disposed in the T-shaped handle on opposite sides of elongate member 46 which extends within the central stem 23 of T-shaped handle 27. A hollow tubular member forms central stem 23 which is the upper part of shift lever 22.

Solenoid 74 is a conventional solenoid and has a plunger 76 that is selectively moveable between a retracted position and an extended position. Wiring 78 (FIG. 3) extends from solenoid 74 through the tubular shaft forming shift lever 22 and is connected to the electrical system of the vehicle. In some embodiments, a standard connector 80 may be provided for connecting wiring 78 with the electrical system of the vehicle.

Figure 3:
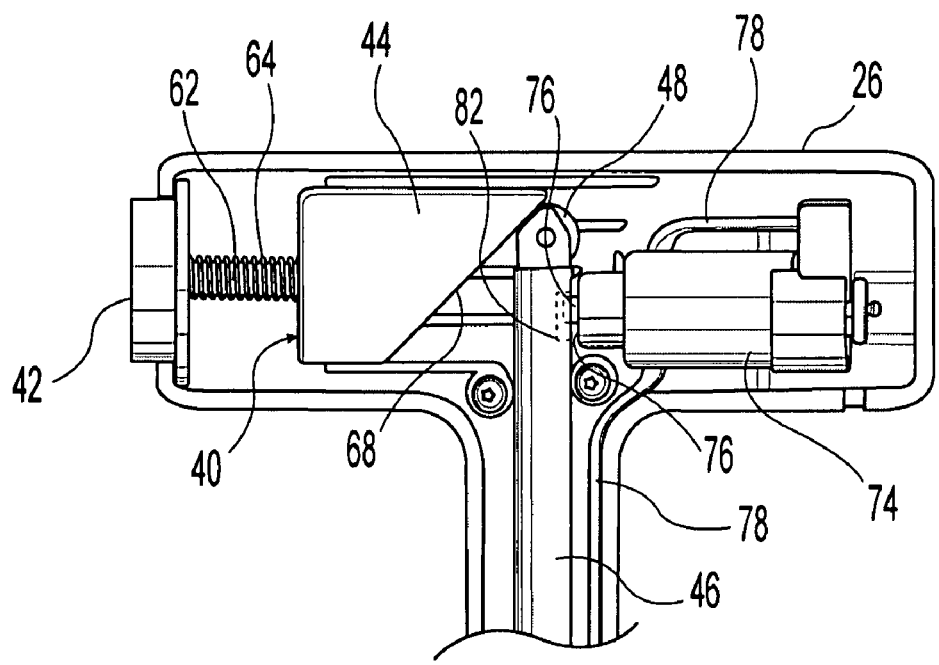
FIG. 3 is a cross sectional view of the grip portion when the gear selector is locked in the Park position.
Figure 4:
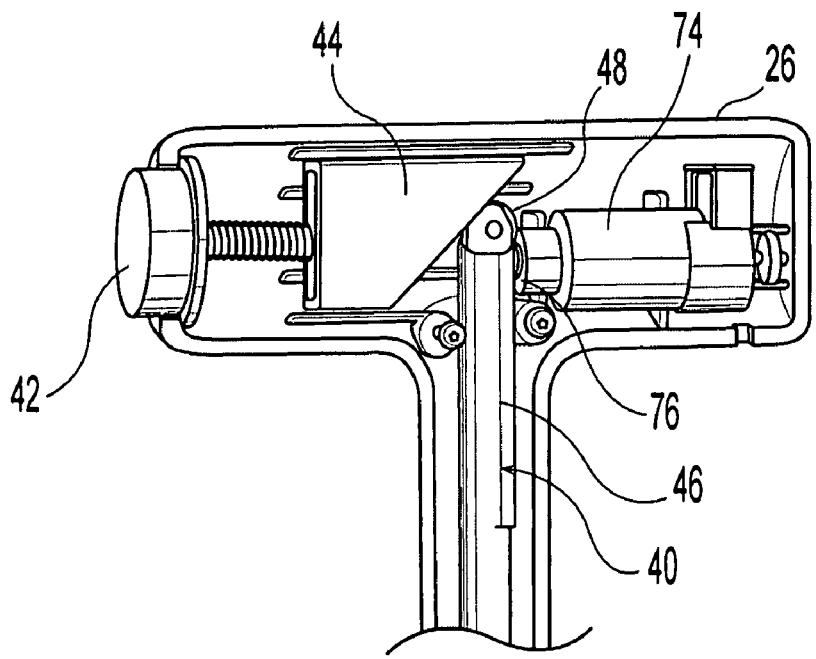
FIG. 4 is a cross sectional view of the grip portion when the gear selector is not in the Park position.

Plunger 76 is operably coupled with mechanical linkage assembly 40 and, when plunger 76 is extended and locking member 50 is seated in parking detent 60, projects into recess 82 formed in elongate member 46 as best seen in FIG. 3. When plunger 76 projects into recess 82 as depicted in FIG. 3, plunger 76 prevents the elongate member 46 from being biased axially away from grip portion 26 thereby ensuring that locking member 50 remains seated within park detent 60 and "locking" shift lever 22 in its parked position. Movement of plunger 76 to a retracted position removes plunger 76 from recess 82 and allows elongate member 46 to be axially displaced and thereby allow shift lever 22 to be moved out of park. In FIG. 4, plunger 76 is in its retracted position and locking member 50 is no longer seated in parking detent 50.

Solenoid 74 is coupled with the electrical system of the vehicle in a manner so that plunger 76 is only retracted when certain conditions are met. For example, plunger may be retracted only when a key has been inserted into the ignition and the ignition has been moved to its "ON" position thereby providing a theft deterrent device. It would also be possible to require the brake lights to be activated (indicating that the driver has depressed the brake pedal) before plunger 76 is retracted as will be readily understood by a person having ordinary skill in the art.

As best understood with reference to FIGS. 1, 3 and 4, those portions of engagement surface 58 corresponding to non-park pivot range 38b are positioned at a greater distance from plunger 76 than the bottom of parking detent 60. Thus, when shift lever 22 is in the park position and locking member 50 seated in parking detent 60, as shown in FIGS. 1 and 3, elongate member 46 will be in an axial position wherein member 46 advances into grip portion 26 to its greatest extent. When elongate member 46 is in this axial position, and plunger 76 is extended outwardly, it will project into recess 82 to lock elongate member 46 in this axial position. Once shift lever 22 has been moved out of park, locking member 50 will engage engagement surface 58 at locations corresponding to non-park pivot range 38b which prevent elongate member 46 from advancing into grip portion 26 to the axial position shown in FIGS. 1 and 3 wherein locking member 50 is seated in park detent 60. FIG. 4 illustrates elongate member 46 while it is in this second range of axial positions. Recess 82 is positioned so that if plunger 76 were extended when shift lever 22 is in the non-park pivot range 38b, recess 82 would not be aligned with plunger 76 and plunger 76 would not prevent the axial movement of elongate member 46.

In other words, FIGS. 1 and 3 illustrate mechanical linkage 40 when it is in a park position configuration and plunger 76 is in an extended position engaged with recess 82 of member 46 which prevents movement of mechanical linkage 40 out of the park position configuration. Retraction of plunger 76 removes plunger from recess 82 allowing relative movement between plunger 76 and elongate member 46 and thereby allowing movement of mechanical linkage 40 out of the park position, e.g., to a position illustrated in FIG. 4, by actuation of driver operated member 42 which biases locking member 50 out of park position detent 60. The axial movement of elongate member 46 which biases locking member 50 out of engagement with park position detent 60 allows pivotal movement of shift lever 22 out of the park position. Once shift lever 22 has been pivoted out of the park position 38a into its non-park position range of movement 38b, engagement of locking member 50 with engagement surface 58 prevents elongate member 46 from returning to the axial position illustrated in FIGS. 1 and 3 where locking member 50 is seated in park position detent 60 and recess 82 is aligned with plunger 76. Elongate member 46 is disposed parallel and coaxially within tubular shaft 28 and as locking member 50 travels along stepped profile 58 during movement of shift lever 22, elongate member 46 moves within shaft 28 through a range of axial positions that does not include the axial position illustrated in FIGS. 1 and 3 where plunger 76 is engageable with recess 82. Thus, elongate member 46 will remain relatively moveable with respect to plunger 76 while shift lever 22 is pivoted through range 38b regardless of whether plunger 76 is retracted or extended. This configuration limits the possibility of the interaction between plunger 76 and elongate member 46 unintentionally locking the transmission in an operating mode other than park. It is noted that while one particularly mechanical linkage assembly has been disclosed various modifications can be made to this linkage assembly while still remaining within the scope of the invention.

A cylindrical housing 84 is formed on base member 54 and is pivoted therewith as shift lever 22 is moved through its range of motion 36. Housing 84 has a ball bearing 86 trapped therein and bearing 86 projects outwardly at one end. A spring 88 located within housing 84 biases bearing 86 into engagement with surface 90 on mounting bracket 24. Surface 90 includes a plurality of detents for receiving bearing 86 to define discrete pivotal positions for shift lever 22 as lever 22 is pivoted through range 36 and provide a positive tactile sensation to the driver as the driver pivots lever 22 through range 36. The use of such bearing and detent surface assemblies are well known to those having ordinary skill in the art.

As best seen in FIG. 1, body 24 also includes a central portion 91 that connects the shift lever portion of body 24 with a pair of side brackets 92. Side brackets 92 include openings 94 through which bolts or other fasteners may be passed to secure body 24 to a vehicle and thereby mount gear selector 20 in the vehicle.

The precise configuration of body 24 will vary depending upon the particular model of vehicle in which gear selector 20 is intended to be mounted. For example, stepped profile 58 will need to be configured to work with the transmission in the vehicle and body 24 will need to be configured so that it can be structurally attached to the vehicle, e.g., through side brackets 92. Gear selectors 20 may be mounted in a vehicle during the initial manufacture of the vehicle, or, be used to replace the gear selector of an existing vehicle. Gear selector 20 is particular well suited for installation in older existing vehicles which do not include a Park lockout feature to provide the vehicle with such a Park lockout feature. Unlike most contemporary vehicles, such older vehicles often include gear selectors that are mounted on the instrument panel and gear selector 20 is easily adapted for mounting on the instrument panel. Gear selector 20 may also be mounted on the floor of the vehicle and in other appropriate locations within the vehicle.

Another aspect of gear selector 20 that makes it well suited for installation in an existing vehicle after removing the original gear selector from the vehicle, is that gear selector 20 is relatively convenient to install and is fully functional within the vehicle upon securing mounting bracket 24 to the vehicle, operably coupling attachment structure 30 with the automatic transmission of the vehicle and operably coupling solenoid 74 with the electrical system of the vehicle through wiring 78. Wiring 78 may be coupled with electrical system through connector 80 or directly spliced with wiring in the vehicles electrical system. In this regard, it is noted that although gear selector 20 is illustrated with a connector 80, for some applications, particularly for applications involving the installation of gear selector 20 in older vehicles, the vehicles may not have a corresponding plug and wiring 76, thereby requiring wiring 76 to be directly spliced with the vehicle wiring. It is further noted that while gear selector 20 will be fully functional within the vehicle after securing body 24, and operably coupling both attachment structure 30 and wiring 76, it will also be generally desirable to mount various covering pieces to hide body 24 and wiring 76 from view within the vehicle. The absence of such covering pieces, however, would not prevent gear selector 20 from functioning within the vehicle.

While this invention has been described as having an exemplary design, the present invention may be further modified within the spirit and scope of this disclosure. This application is therefore intended to cover any variations, uses, or adaptations of the invention using its general principles.

What is claimed is:

1. A transmission gear selector operable by a driver of a vehicle having an automatic transmission with a plurality of operating modes, the plurality of operating modes including a park mode, said gear selector comprising:

a shift lever mountable on the vehicle, said shift lever moveable through a pivotal range of motion and defining a pivot axis, said shift lever having a grip portion adapted for gripping by the driver and an attachment structure adapted for operably coupling said gear selector to the automatic transmission whereby pivoting movement of said shift lever through said pivotal range shifts the automatic transmission between the plurality of operating modes, and wherein pivotally disposing said shift lever in a park position shifts the automatic transmission into the park mode;

a locking member operably coupled and pivotally moveable with said shift lever;

a body defining an engagement surface, said locking member moveably engageable with said engagement surface, said engagement surface defining a park position detent wherein said locking member is engageable with said park position detent when said shift lever is in said park position, engagement of said locking member with said park position detent preventing pivotal movement of said shift lever out of said park position;

a mechanical linkage assembly having a driver-operated member and operably engaged with said locking member wherein said mechanical linkage is disposed in a park position configuration when said locking member is engaged with said park position detent, actuation of said driver-operated member moving said mechanical linkage out of said park position configuration, movement of said mechanical linkage out of said park position configuration biasing said locking member out of engagement with said park position detent and thereby allowing pivotal movement of said shift lever out of said park position; and a solenoid disposed within said grip portion, said solenoid having a plunger selectively moveable between a first plunger position and a second plunger position, said plunger operably coupled with said mechanical linkage assembly wherein, when said mechanical linkage is in said park position configuration and said plunger is in said first plunger position, said plunger engages a recess in said mechanical linkage in said grip portion and prevents movement of said mechanical linkage and thereby prevents biasing said locking member out of engagement with said park position detent and wherein, when said plunger is in said second plunger position, said plunger disengages from said recess in said mechanical linkage and allows movement of said mechanical linkage and thereby allows biasing of said locking member out of engagement with said park position detent.

2. The gear selector of claim 1 wherein said pivotal range of motion of said shift lever defines said park position and a non-park position range of motion and wherein said mechanical linkage assembly includes an elongate member extending substantially parallel with said shift lever, said elongate member operably disposed between said driver-operated member and said locking member, said locking member being biased out of engagement with said park position detent by axial movement of said elongate member wherein said elongate member has a first axial position when said locking member is in said park position detent and said elongate member is moveable through a range of second axial positions when said lever is pivoted through said non-park position range of motion, said first axial position being outside of said range of second axial positions.

3. The gear selector of claim 2 wherein, when said solenoid plunger is in said first plunger position and said elongate member is in said first axial position, said plunger and said elongate member are engaged thereby securing said elongate member in said first axial position;

said plunger and said elongate member being relatively moveable when said plunger is in said second position; and said plunger and said elongate member being relatively moveable when said elongate member is in said range of second axial positions.

4. The gear selector of claim 3 wherein engagement of said locking member with said engagement surface prevents said elongate member from returning to said first axial position when said locking member is disposed outside of said park position detent.

5. The gear selector of claim 4 wherein grip portion and defines a T-shaped handle, said elongate member extending within a central stem of said T-shaped handle; said driver operated member and said solenoid being disposed in said handle on opposite sides of said elongate member.

6. The gear selector of claim 5 further comprising a wedge shaped linkage operably disposed between said driver operated member and said elongate member.

7. The gear selector of claim 4 wherein said engagement surface defines a stepped profile, said stepped profile requiring axial displacement of said locking member by actuation of said driver operated member of said mechanical linkage assembly for movement of said shift lever between selected pivotal positions of said shift lever.

8. The gear selector of claim 1 wherein said body comprises a mounting bracket attachable to the vehicle, said shift lever being pivotally mounted to said mounting bracket.

9. A transmission gear selector operable by a driver of a vehicle having an automatic transmission with a plurality of operating modes, the plurality of operating modes including a park mode, said gear selector comprising:

a shift lever mountable on the vehicle, said shift lever moveable through a pivotal range of motion and defining a pivot axis, said shift lever having an elongate tubular portion, a grip portion adapted for gripping by the driver proximate one end of said elongate tubular portion and an attachment structure adapted for operably coupling said gear selector to the automatic transmission proximate an opposite end of said elongate tubular portion whereby pivoting movement of said shift lever through said pivotal range shifts the automatic transmission between the plurality of operating modes, and wherein pivotally disposing said shift lever in a park position shifts the automatic transmission into the park mode;

a locking member operably coupled and pivotally moveable with said shift lever;

a mounting bracket, said shift lever being pivotally mounted on said mounting bracket, said mounting bracket further defining an engagement surface, said locking member moveably engageable with said engagement surface, said engagement surface defining a park position detent wherein said locking member is engageable with said park position detent when said shift lever is in said park position, engagement of said locking member with said park position detent substantially preventing pivotal movement of said shift lever out of said park position;

a mechanical linkage assembly having a driver-operated member disposed on said grip portion, said driver-operated member being operably coupled with an elongate member extending within said elongate tubular portion of said shift lever; said mechanical linkage being operably coupled with said locking member wherein said elongate member is disposed in a first axial position when said locking member is engaged with said park position detent, actuation of said driver-operated member moving said elongate member out of said first axial position thereby biasing said locking member out of engagement with said park position detent and allowing pivotal movement of said shift lever out of said park position; and a solenoid disposed within said grip portion, said solenoid having a plunger selectively moveable between a first plunger position and a second plunger position, said plunger operably coupled with said elongate member wherein, when said elongate member is in said first axial position and said plunger is in said first plunger position, said plunger engages a recess in said elongate member within said grip portion and prevents axial movement of said elongate member and thereby prevents biasing said locking member out of engagement with said park position detent and wherein, when said plunger is in said second plunger position, said plunger disengages from said recess in said elongate member and allows axial movement of said elongate member and thereby allows biasing of said locking member out of engagement with said park position detent.

10. The gear selector of claim 9 wherein said pivotal range of motion of said shift lever defines said park position and a non-park position range of motion and said elongate member is moveable through a range of second axial positions when said shift lever is pivoted through said non-park position range of motion, said first axial position being outside of said range of second axial positions;

said plunger and said elongate member being relatively moveable when said plunger is in said second position; and said plunger and said elongate member being relatively moveable when said elongate member is in said range of second axial positions.

11. The gear selector of claim 10 wherein engagement of said locking member with said engagement surface prevents said elongate member from returning to said first axial position when said locking member is disposed outside of said park position detent.

12. The gear selector of claim 9 wherein said locking member comprises a pin extending substantially perpendicular to said elongate member, said pin being secured to said elongate member and axially moveable therewith.

13. The gear selector of claim 12 wherein said mounting bracket defines a pair of stepped profiles disposed on opposing sides of said shift lever, said pin being engageable with each of said pair of stepped profiles.

14. The gear selector of claim 13 further comprising wiring in communication with said solenoid and extending from said solenoid through said tubular shaft.

15. The gear selector of claim 14 wherein said gear selector is adapted for installation in an existing vehicle for replacing a previously installed device, said gear selector being fully functional within the existing vehicle upon securing said mounting bracket to the pre-existing vehicle; operably coupling said attachment structure with an automatic transmission of the pre-existing vehicle; and operably coupling said solenoid with an electrical system of the pre-existing vehicle through said wiring.

16. The gear selector of claim 15 wherein said grip portion defines a T-shaped handle, said elongate member extends within a central stem of said T-shaped handle and said driver operated member and said solenoid are disposed in said handle on opposite sides of said elongate member.

17. The gear selector of claim 16 further comprising a wedge shaped linkage operably disposed between said driver operated member and said elongate member.

18. The gear selector of claim 17 wherein said pivotal range of motion of said shift lever defines said park position and a non-park position range of motion and said elongate member is moveable through a range of second axial positions when said shift lever is pivoted through said non-park position range of motion, said first axial position being outside of said range of second axial positions;

said plunger and said elongate member being relatively moveable when said plunger is in said second position; and said plunger and said elongate member being relatively moveable when said elongate member is in said range of second axial positions.

19. The gear selector of claim 18 wherein engagement of said locking member with said engagement surface prevents said elongate member from returning to said first axial position when said locking member is disposed outside of said park position detent.

20. The gear selector of claim 19 wherein said gear selector is adapted for installation in an existing vehicle for replacing a previously installed device, said gear selector being fully functional within the existing vehicle upon securing said mounting bracket to the pre-existing vehicle; operably coupling said attachment structure with an automatic transmission of the pre-existing vehicle; and operably coupling said solenoid with an electrical system of the pre-existing vehicle with wiring in communication with said solenoid and extending from said solenoid through said tubular shaft.

* * * * *